E. J. FARNUM.
TRACTOR.
APPLICATION FILED MAR. 28, 1919.
1,326,397.
Patented Dec. 30, 1919.
2 SHEETS—SHEET 1.
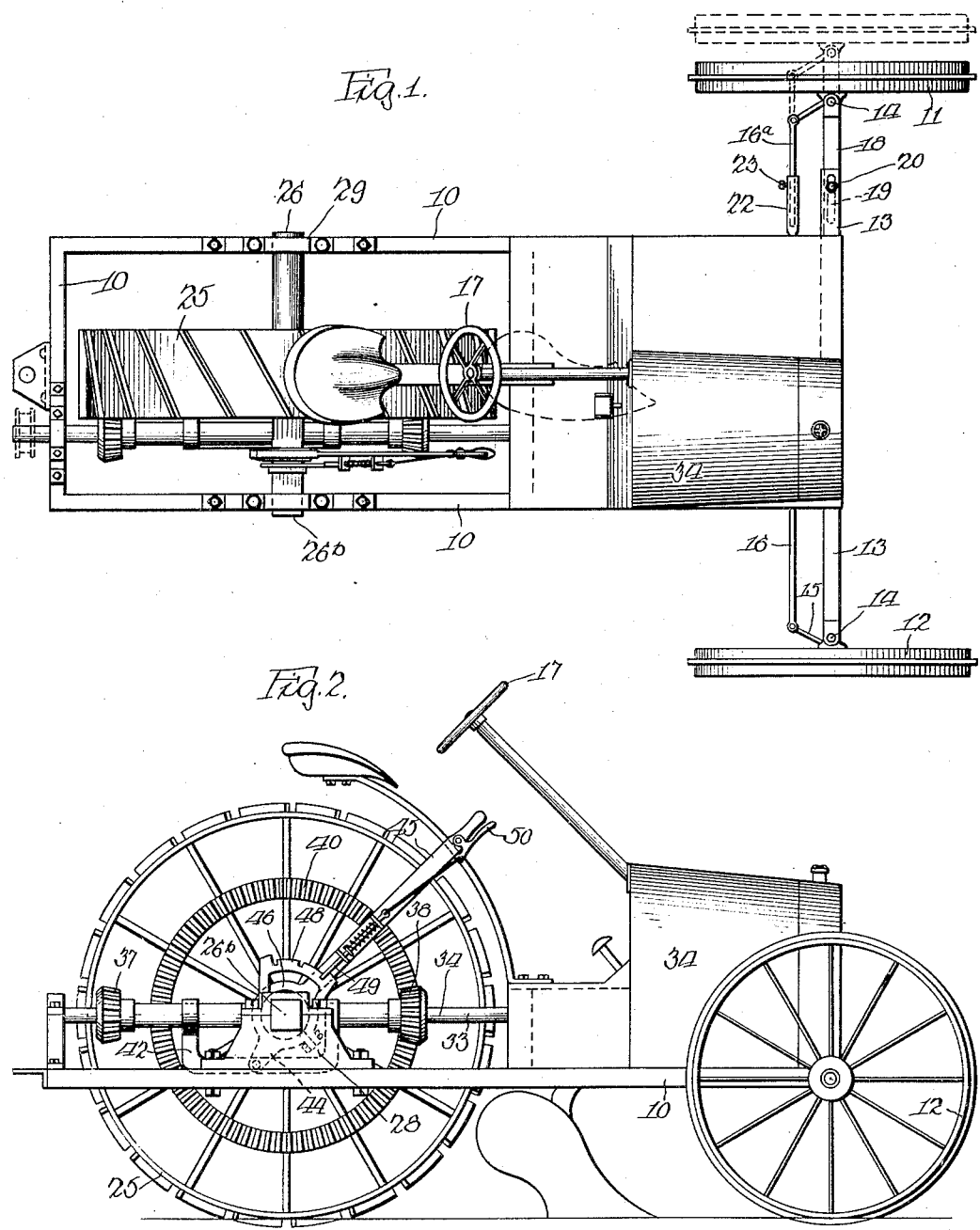
Inventor:
Edward J. Farnum
By Luther Johns
Atty.
Witness:
Leo J. Dubois E. J. FARNUM.
TRACTOR.
APPLICATION FILED MAR. 28, 1919.
1,326,397.
Patented Dec. 30, 1919.
2 SHEETS—SHEET 2.
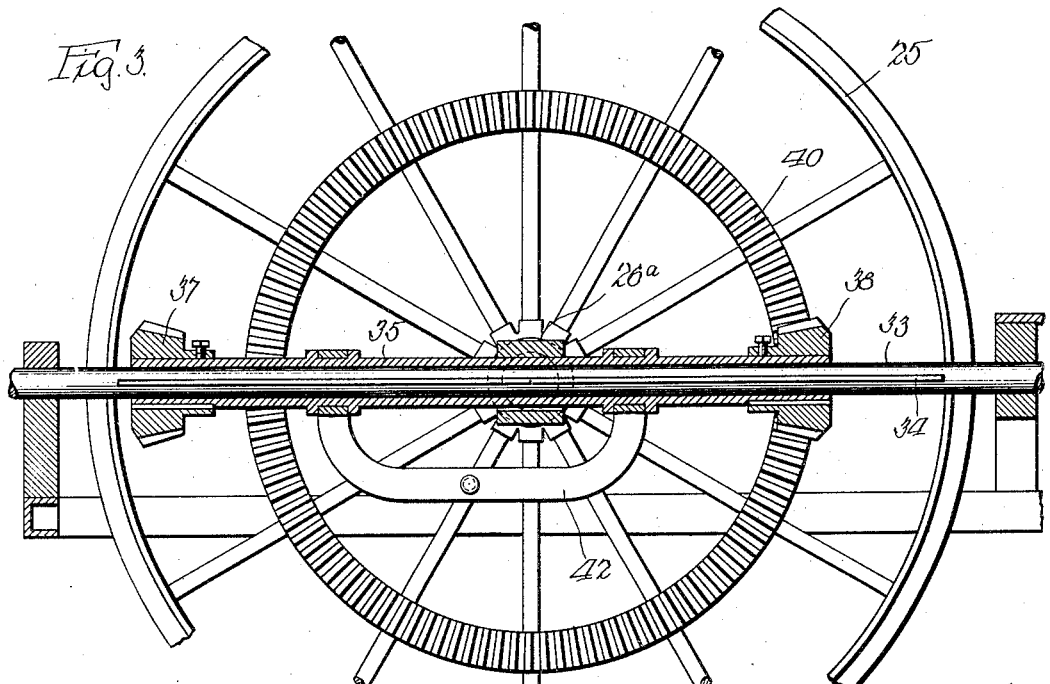
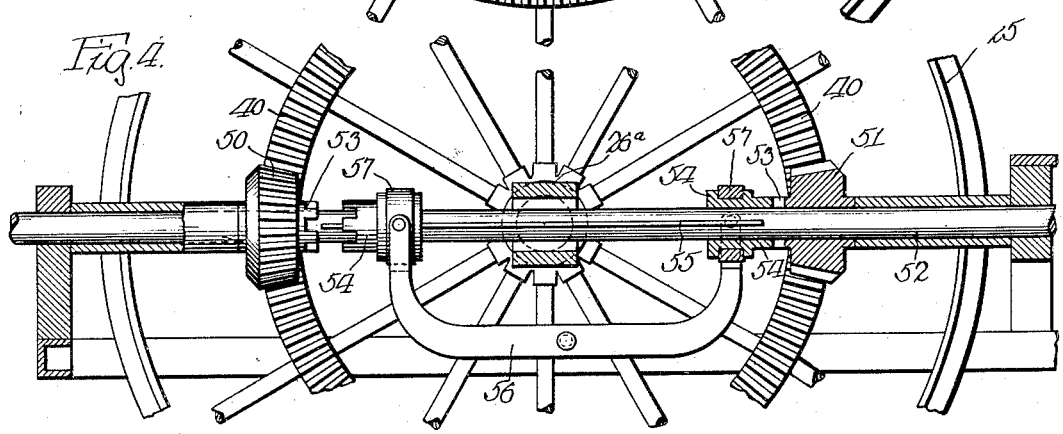
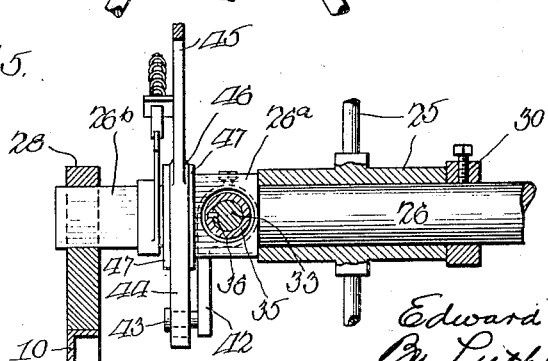

UNITED STATES PATENT OFFICE.

EDWARD J. FARNUM, OF FOX LAKE, ILLINOIS, ASSIGNOR OF ONE-HALF TO WILLIAM G. NAGLE, OF FOX LAKE, ILLINOIS.

TRACTOR.

1,326,397.     Specification of Letters Patent.     Patented Dec. 30, 1919.

Application filed March 28, 1919. Serial No. 285,710.

*To all whom it may concern:*

Be it known that I, EDWARD J. FARNUM, a citizen of the United States, residing at the village of Fox Lake, Lake county, Illinois, have invented certain new and useful Improvements in Tractors, of which the following is a specification.

My invention relates to tractors, with more particular reference to driving mechanism therefor and to means for adjusting laterally one of the front wheels.

The principal objects of these improvements are to provide a simple, strong, durable and highly efficient driving mechanism for tractors and also to provide a feature of wheel adjustment, valuable particularly in plow tractors, whereby the tractor as a whole may be readily maintained in such a line of travel as to cut substantially parallel furrows, rendering the operation of accurate plowing simple and easy and making such plowing possible to relatively unskilled operators. The front wheel traveling in the furrow adjacent to the one being cut also finds a more even and regular path, saving power and also coöperating to maintain the plow at a substantially constant relative elevation. Other objects and advantages will appear hereinafter.

In the accompanying drawings, which form a part of this specification, I have illustrated these improvements as applied to a three-wheel tractor of notable utility, and have shown a modified form of the driving gear mechanism. In these drawings Figure 1 is a top plan of the tractor; Fig. 2 is a side view thereof; Fig. 3 is an enlarged fragmentary medial longitudinal sectional view of the preferred form of driving mechanism; Fig. 4 is a similar view of a modified form of driving mechanism; and Fig. 5 is a fragmentary medial transverse sectional view of parts at and near the middle of the driving wheel.

My improved tractor includes a frame 10 carrying a pair of front wheels 11 and 12 supported by an axle 13, 18, the wheels being pivotally mounted at 14 and moved for steering purposes through the well-known form of knuckle 15, cross rod 16 and steering wheel 17. I have not illustrated the steering mechanism in detail, as such is well-known. The axle 13 has an interfitting telescopic extension 18 provided with a slot 19 accommodating the bolt 20. The steering rod 16 has a similar telescopic device comprising a hollow head 22 into which the rod 16ª extends loosely, the latter being held rigidly by the set screw 23. From this construction it will be clear that the wheel 11 may be adjusted bodily in lateral directions, the operator being thus enabled to cause this wheel to travel in the furrow adjacent to the one being cut, thus attaining the objects in this respect hereinabove pointed out.

The driving wheel 25 is medially arranged between the side elements of the frame 10, and is mounted loosely upon the axle, shaft or mandrel-like support 26, which is circular in cross section where the driving wheel 25 rotates (see Fig. 5), is enlarged and square in cross section at 26ª, and is also square in cross section at 26ᵇ, namely, from the part 26ª to the end of the shaft. The end 26ᵇ is held positively in the bracket 28 carried by the frame 10, the opposite end of the shaft or support 26 being carried by a bracket 29. A collar 30 (Fig. 5) maintains the wheel 25 in its desired position on the axle or support 26.

The driving shaft 33 issues from the engine casing 34 containing an internal combustion engine (not shown). In my practice this is a relatively slow engine developing say 300 revolutions per minute. The driving shaft 33 is cut with a longitudinal groove 34. On this shaft 33 is mounted a tubular gear carrier 35 (see Fig. 5) which gear carrier has an internal longitudinal rib or spline 36 interfitting with the groove 34, the gear carrier 35 being thus carried positively for rotation by the shaft 33 while it may be moved longitudinally of the shaft.

The gear carrier 35 carries a pair of beveled gears 37 and 38 adapted to intermesh with the circular rack 40 positively carried by the driving wheel 25 on one side thereof and in concentric arrangement therewith. The square portion of the driving wheel support at 26ª is apertured transversely to accommodate the gear carrier 35, and this driving wheel support or mandrel thus acts as a bearing for the rotating member 35 and a construction is provided whereby the driving shaft 33 is positioned in exact diametric arrangement with respect to the rack 40 and driving wheel 25, while maintaining the shaft 33 close to the rack 40, and while providing a strong support or shaft 26 which is well sustained by having its ends supported by the side frames of the machine. This construction provides compactness and strength and facilitates the employment of simple and highly efficient means for driving the device in either direction.

The gears 37 and 38 are so arranged that only one is in mesh with the rack 40 at a given time, the shifting of the member 35 throwing one of the gears into mesh and simultaneously throwing the other out of mesh with the rack 40.

Means for shifting the gears and gear support comprise the yoke 42 carrying the pin 43, which pin passes through the extension 44 of the hand lever 45. This hand lever 45 is provided with a hub or collar at 46 which rotates upon a bushing 47 mounted upon the square part 26$^b$ of the shaft or driving wheel support 26. A rack 48 having three notches, well shown in Fig. 2, controls the position of the hand lever 45 through the detent 49 which is raised and lowered by the hand piece 50 in a well-known way. When the hand lever 45 is in the relative position shown by Fig. 2 the gear 38 is in mesh with the rack 40. When the lever 45 is thrown to the other extreme of the rack 48 the gear 37 is in mesh with the rack 40, and when the lever 45 is in the intermediate position neither of the gears is in driving relation to the rack 40.

Turning now to Fig. 4 the description already given for the other figures applies, with the following changes: The driving gears 50 and 51 are simultaneously in mesh with the rack 40. These gears are carried positively by the driving shaft 52, each gear having a clutch element 53 thereon, there being a pair of coöperating clutch elements 54 rotatably carried by the shaft 52. A longitudinal groove 55 is cut in the shaft 52, and there is a rib or spline interfitting with it carried by the clutch element (the same as the spline 36, Fig. 5) as is well understood in clutch construction. The yoke 56 has at its ends the collars 57 accommodated loosely in grooves in the clutch element 54, as well shown in the sectional part of the figure. It will thus be seen that the two clutch elements 54 may be shifted as a unitary device so that one driving clutch element 54 or the other will be in driving engagement with the adjacent coöperating driven clutch element 53, and that the driving gear 50 or 51 will be operative to drive the rack 40 and consequently the wheel 25.

In both the preferred and modified forms the provision of driving gears adapted to operate upon the rack 40 on diametrically opposite portions thereof has the function of causing the driving wheel 25 to travel in one direction or the other. In such a device as a tractor there is constant necessity for reversing the direction of movement, and this driving and reversing mechanism must be simple, strong and durable in order to be effective. My present invention provides such a construction, and I am thus able to provide a device having exceedingly few parts and which is of the desired strength and durability.

Various changes and departures from what is specifically shown and described are contemplated by me as being within the invention as hereinafter claimed.

I claim:

1. Driving mechanism for tractors comprising in combination a driving wheel, a circular toothed rack secured concentrically on said driving wheel, a driving shaft diametrically arranged with respect to said wheel and rack and adjacent to said rack, a pair of driving gears carried by said shaft, one of said gears being on one side of the center of said wheel and rack and the other being on the opposite side thereof, said gears respectively being adapted to engage said rack operatively so as to rotate the rack, and being so connected operatively to said shaft that when either gear engages the rack operatively the other is out of engagement operatively with the rack, means for throwing either gear into operative relation to the rack, a shaft-like support for said driving wheel, said wheel support being apertured transversely for said shaft and constituting a support for the latter.

2. In a tractor the combination of a frame, a wheel support crosswise thereof, a driving wheel rotatably mounted on said support, a circular toothed rack carried concentrically by said driving wheel, a driving shaft diametrically arranged with respect to said rack, said wheel support being apertured transversely to receive said driving shaft and support the same, and a gear on said driving shaft meshing with said rack.

EDWARD J. FARNUM.